Figure 1:
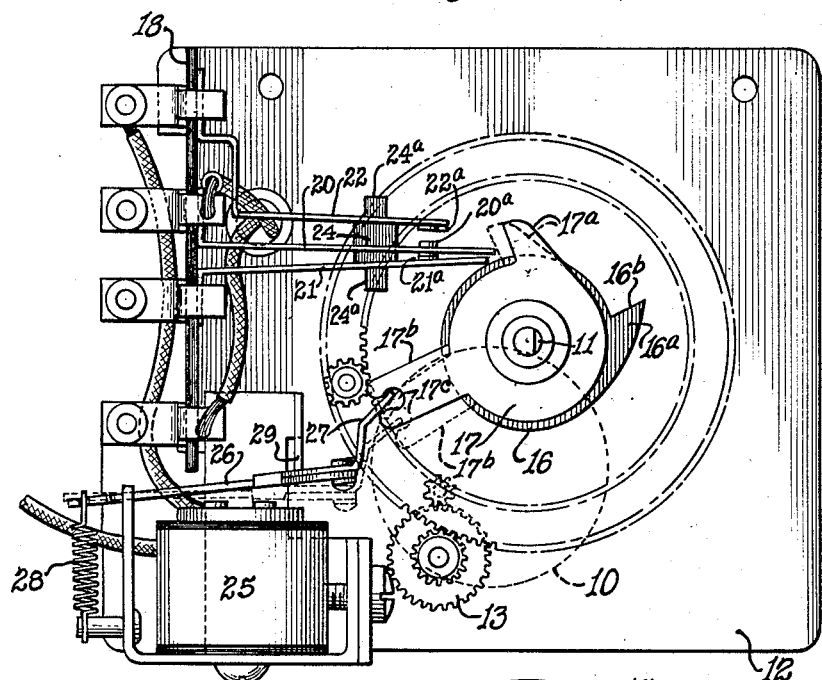

Sept. 28, 1954 D. MORRISON 2,690,526
CONTROL MEANS FOR DEFROSTING REFRIGERATORS
Filed Oct. 9, 1950 2 Sheets-Sheet 1

INVENTOR
David Morrison
BY Frank J. Schraeder Jr.
Attorney

Sept. 28, 1954 D. MORRISON 2,690,526
CONTROL MEANS FOR DEFROSTING REFRIGERATORS
Filed Oct. 9, 1950 2 Sheets-Sheet 2
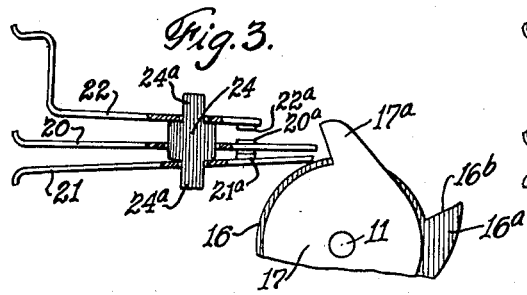
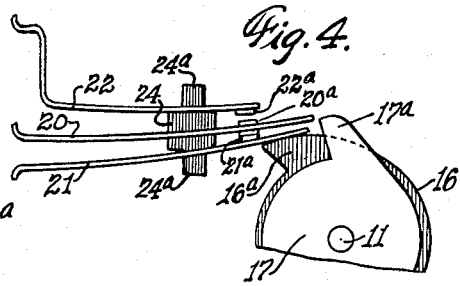
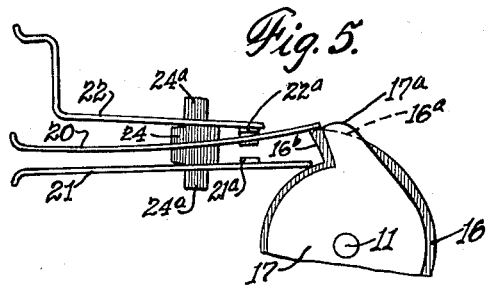
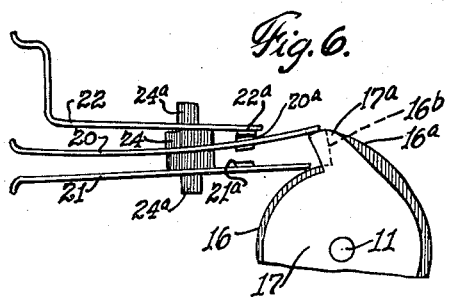
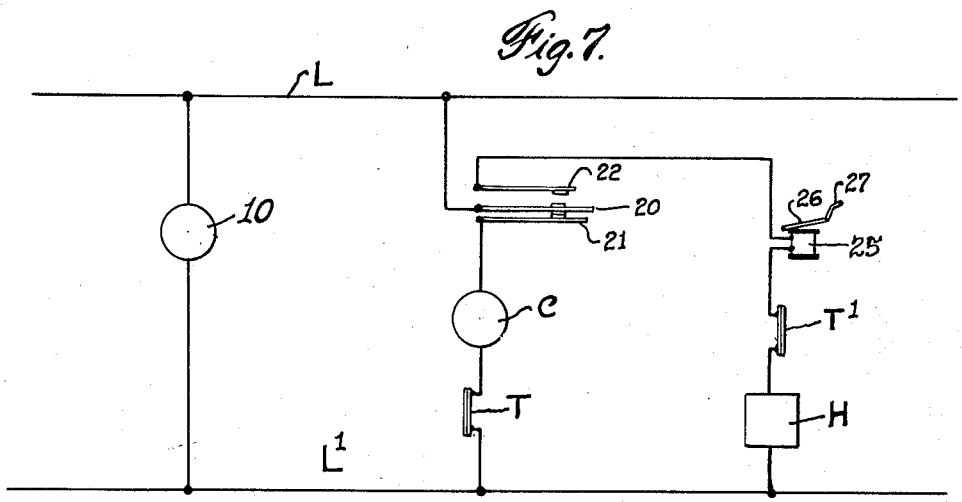
INVENTOR
David Morrison
By Frank Schraeder Jr
Attorney Patented Sept. 28, 1954

2,690,526

UNITED STATES PATENT OFFICE 2,690,526

CONTROL MEANS FOR DEFROSTING REFRIGERATORS

David Morrison, Manitowoc, Wis., assignor to Paragon Electric Company, Two Rivers, Wis., a corporation of Wisconsin Application October 9, 1950, Serial No. 189,121

5 Claims. (Cl. 317—141)

By providing an electrically operated refrigerator with an electrical heating element, rapid defrosting may be effected periodically through opening of the circuit for the refrigerating apparatus and closing the circuit through the heater. Defrosting becomes automatic when a constantly operating timer is caused to operate a switch to make the necessary circuit changes. The usual practice is to turn on the heater for a few minutes, once during each twenty-four hour period, the length of time during which the heater circuit is closed while the other remains open being determined by controlling cams. While it is an easy matter to adjust a cam so as to initiate a defrosting operation, adjustment for later terminating that operation in that way is not satisfactory.

The purpose or object of the present invention is to provide a simple and novel system of defrosting, whereby a cam is used only to begin a defrosting period, as to which there is no demand for extreme accuracy.

When the accumulated frost has all melted, further heating serves simply to raise the temperature in the refrigerator. Therefore, it is better to shut off the heat before the refrigerator temperature rises to an objectionable level, than after a given time interval which may not always be the correct one.

Specifically regarded, my invention may be said to have for its purpose or object to provide a simple temperature controlled means for ending a defrosting period, in the operation of a refrigerator, after that period has been initiated at any arbitrarily selected time.

Just as the circuit for the compressor is deenergized by a thermostatic switch at a predetermined low temperature, the defrosting circuit may be deenergized by a similar switch at a predetermined high temperature.

In accordance with my invention I provide simple and novel means to keep the defrosting circuit closed and the circuit for the refrigerating apparatus open independently of the cam means, after the defrosting circuit has been closed, until the high temperature thermostat determines the end of the defrosting period and causes normal refrigerating conditions to be restored.

In the preferred form of my invention, when the cam operates switch means to open the circuit for the refrigerating apparatus and to close the heater circuit, it also causes the heating current to energize an electromagnetic device for holding said switch means in the state to which the cam has brought it; this state being maintained only until the high temperature thermostat again opens the heater circuit after defrosting is completed.

Figure 2:
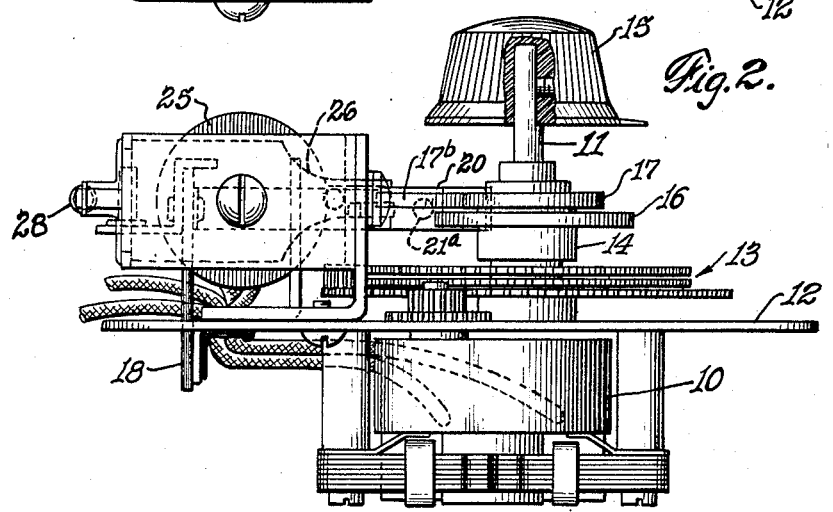

The various features of novelty whereby the present invention is characterized will hereinafter be pointed out with particularity in the claims, but, for a full understanding of the invention and of its objects and advantages, reference may be had to the following detailed description taken in connection with the accompanying drawings, wherein:

Figure 1 is a top plan view of a timer unit embodying the present invention, with the casing and the knob for setting the same removed; Fig. 2 is a side view of said unit looking upward toward Fig. 1, with the knob in place; Figs. 3, 4, 5 and 6 are four views of the main switch means and the immediate operating devices therefor, illustrating four different relative positions of the parts; and Fig. 7 is a diagram of a system in which said unit has been incorporated.

Referring to the drawings, 10 represents a motor which, as in conventional timers, is geared to a shaft 11 so as to turn it very slowly. Defrosting is usually done once every day, in which case shaft 11 makes one complete turn in twenty-four hours. The motor is mounted on the under side of a main supporting plate 12, with the shaft 11 standing upright above said plate. There is the usual clutch between said shaft and the driving gear train 13, to permit the shaft to be turned in the clockwise direction independently of the motor, 14 being the clutch casing. On the upper end of shaft 11 is the usual knob 15, adapted to cooperate with a dial not shown, for turning the shaft, independently of the motor, in the clockwise direction, to determine the point of time at which a defrosting cycle is to start. All of the parts just described are old and well known.

Fixed to shaft 11 is a cam 16 of insulating material in the form of a disc provided with a peripheral lug 16$^a$ the advance edge of which increases gradually in radius. The trailing edge 16$^b$ of the lug is at a small angle to an adjacent radius to allow an element raised by the lug to drop abruptly when it is at the trailing edge.

Loose on the shaft, above the cam, is a disc 17 of insulating material provided with a nose 17$^a$ projecting radially therefrom. The tip of the nose is preferably at a somewhat lesser radial distance from the axis of rotation than is the tip of the cam lug. Disc 17 also has a radial arm 17$^b$ projecting therefrom at an angular distance of about ninety degrees from the nose. In the outer end of this arm is a notch or socket 17c.

Mounted on an upright panel 18 of insulating material on the upper side of the main supporting plate 12 is a switch device shown as comprising three spring blades 20, 21 and 22. These blades are anchored at corresponding ends to the panel and extend, more or less parallel to each other, toward the cam 16 and disc 17. Blade 20 is a little longer than blade 21, whereas blade 22 need not be as long as either of the others.

The blades are arranged on edge and blade 20, at least, is sufficiently wide to overlap both lug 16a and nose 17a. Blade 20 has a double contact 20a for cooperation with contacts 21a and 22a on blades 21 and 22, respectively. Cooperating with these switch blades is a little slab 24 of insulating material that extends loosely through blade 20, inwardly from the aforesaid contacts, as shown in Fig. 3; member 24 serving both as a spacer between blades 21 and 22 and to transmit pressure from blade 21 directly to blade 22, upon flexing the blade 21. This little slab has projecting lugs 24a at its ends; one of these lugs passing loosely through blade 21 and the other cooperating in a like manner with 22.

On top of the supporting plate, beyond one end of switch panel 18, is an electromagnet 25 provided with an oscillatory armature 26. Attached to one end of this armature is a finger 27 the free end of which extends into notch or socket 17c in the arm on disc 17. Acting on the other end of the armature is a spring 28 that constantly tends to hold the armature away from the electromagnet and against a stationary stop 29. The armature therefore serves to rock disc 17 between the full line and the dotted line positions shown in Fig. 1. The spring normally holds disc 17 in its full line or idle position, whereas the electromagnet, when energized, moves the same into the dotted line or working position and keeps it there until the electromagnet is again deenergized.

In Fig. 7 I have illustrated the manner in which the timer unit, just described, is connected with the refrigerating system and the defrosting means of an electric refrigerator. Motor 10 is connected directly across current supply lines L and L¹. The compressor element C of the refrigerator, with its controlling thermostat switch T, is connected across said lines in series with blades 20 and 21. Electromagnet 25 is connected across the lines in series with the usual heater H, thermostat switch T¹ and switch blades 20 and 22.

Normally, that is except during the short defrosting periods, switch blades 20 and 21 are in contact with each other as shown in Figs. 1, 3 and 4, Figs. 1 and 3 illustrating the condition shortly after a defrosting operation and Fig. 4 a condition as the time for defrosting is approaching. That is, the refrigerating apparatus is then operating in the usual way, with the compressor functioning under the usual temperature control means. During this time blade 21 rides on the periphery of cam disc 16, while under sufficient stress to insure a good electrically conductive connection between contacts 20a and 21a. The motor drives the cam continuously in the clockwise direction at a uniform rate, so that once in each twenty-four hours cam lug 16a moves up under the free end of blade 21 and presses all three blades up as shown in Fig. 4. When the tip of the cam lug reaches the extreme end of blade 21, that blade is released and snaps down into its natural resting position as shown in Fig. 5. Long blade 20, however, is still riding on the cam lug and so contact between blades 20 and 21 is interrupted. As will be apparent from the diagram, the compressor circuit is now broken and the refrigerating process ceases.

Blade 22 is under such initial stress, that, as soon as blade 21 snaps down off the cam lug, blades 20 and 22 make contact with each other, as in Fig. 5. Therefore, as the compressor circuit is broken, the circuit through the heater H and the electromagnet 25 is completed. The immediate result of this is that the electromagnet is energized and draws its armature to it, thereby rocking disc 17 in the counterclockwise direction from the position that it occupies in Fig. 5 to the position wherein its nose is beneath blade 20. This takes place without danger of having nose 17a catch on the end edge of blade 20, the nose 17a being not quite as high as the tip of the cam lug 16a. Then, as the cam 16 continues to turn, it passes from under blade 20 and allows the latter to drop down on nose 17a, as in Fig 6. In other words, the cam 16 has completed its work in connection with the defrosting operation now in progress and has nothing more to do except move on to start another cycle a day later.

Once the electromagnet 25 has been energized, the heater circuit remains closed and the compressor circuit cannot be closed, until the thermostat switch T¹ opens, signifying that defrosting has been completed. Thereupon spring 28 rocks armature 26 and, through the latter, disc 17, so as to move nose 17a out from under blade 20 to permit the conditions shown in full lines in Fig. 1 and in Fig. 3 to be reestablished and the compressor circuit to be closed again.

By means of my invention I am thus enabled positively to initiate a defrosting operation at any given time of day or night and to bring that operation to a close when defrosting has been completed, without attempting to fix a definite time limit which may be too long or too short at times, depending on the atmospheric conditions under which a refrigerator is being used.

While I have illustrated and described with particularity only a single preferred form of my invention, I do not desire to be limited to the exact details thus illustrated and described, but intend to cover all forms and arrangements that come within the definitions of my invention constituting the appended claims.

I claim:

1. Controlling means for two circuits comprising two cooperating spring blades extending in the same direction and normally engaged with each other, the blades being anchored at corresponding ends with the free end of one blade projecting slightly beyond the free end of the other, said blades being connected in the first of said circuits and closing the same when the blades engage each other, a contact piece in the path of the longer blade when both blades are flexed toward it, a continuously rotating member on which the free ends of the blades normally rest, a cam lug on said member to flex both blades until the longer blade touches said contact piece, said lug being shaped to release the shorter blade abruptly and allow it to drop while the longer blade still rests on the lug, an element beside the cam and rockable from an idle position to a working position in which it underlies the free end of and is near the longer blade, means yieldingly holding said element in its idle position, and an electromagnet to rock said element into its working position; said electromagnet having an energizing coil arranged in series with said contact piece and said longer blade in the second circuit whenever that blade engages said contact piece.

2. Control means for a circuit that contains a switch which opens at a predetermined low temperature and a second circuit that opens at a predetermined high temperature, comprising two cooperating spring blades extending in the same direction and normally engaged with each other, the blades being anchored at corresponding ends with the free end of one blade projecting slightly beyond the free end of the other, said blades being connected in the first of said circuits and closing the same when the blades engage each other, a contact piece in the path of the longer blade when both blades are flexed toward it, a continuously rotating member on which the free ends of the blades normally rest, a cam lug on said member to flex both blades until the longer blade touches the stationary contact, said lug being shaped to release the shorter blade abruptly while the longer blade still rests on the lug, an element beside the cam and rockable from an idle position to a working position in which it underlies the free end of the longer blade, means yieldingly holding said element in its idle position and an electromagnet to rock said element into its working position; said electromagnet having an energizing coil arranged in series with said contact piece and said longer blade in the second circuit whenever that blade engages said contact piece, whereby the electromagnet is deenergized and said rocking element returns to its idle position and releases the longer blade when said predetermined high temperature is reached.

3. A switch comprising three spring blades arranged on edge and side by side, said blades being anchored at corresponding ends, and a spacer of insulating material arranged between the two outer blades and passing loosely through the central blade, said spacer having at its ends lugs that extend loosely through both outer blades to hold the spacer in place whereby the central blade may be shifted into engagement with either outer blade and the spacer serves, upon flexing the first of the outer blades, to transmit pressure directly to the second outer blade and flex it also.

4. In combination, a switch comprising three spring blades arranged on edge and side by side, said blades being anchored at corresponding ends and having their other ends free, the central blade being initially stressed to maintain contact with the first outer blade and stand clear of the second outer blade, a spacer of insulating material arranged between the outer blades and passing loosely through the central blade, the free end of the central blade projecting a little beyond the corresponding end of said first outer blade, and a rotatable cam beside the said first outer blade and engaging the same adjacent to its free end; the periphery of said cam having a high portion that causes all three blades to be flexed laterally, and said periphery changing abruptly from the high portion to a low portion so that said first outer blade snaps away from the central blade at a predetermined point in the rotation of the cam.

5. The combination set forth in claim 4 having as an addition, a member that may be moved under the free end of the central blade after said first outer blade has left the high portion of the cam and while the central blade still rests on such high portion.

References Cited in the file of this patent

UNITED STATES PATENTS

| Number | Name | Date |
|---|---|---|
| 2,078,109 | Townsend | Apr. 20, 1937 |
| 2,100,284 | Kriechbaum | Nov. 23, 1937 |
| 2,215,067 | Denison | Sept. 17, 1940 |
| 2,307,567 | Coggeshall | Jan. 5, 1943 |
| 2,313,390 | Newton | Mar. 9, 1943 |
| 2,334,513 | Shaw | Nov. 16, 1943 |
| 2,487,573 | Meier | Nov. 8, 1949 |
| 2,487,674 | Rott | Nov. 8, 1949 |
| 2,501,452 | Pratt | Mar. 21, 1950 |
| 2,522,199 | Shreve | Sept. 12, 1950 |